United States Patent [19]

Kobayashi et al.

[11] 4,229,804
[45] Oct. 21, 1980

[54] NUMERICAL CONTROL UNIT HAVING A CASSETTE TYPE MEMORY

[75] Inventors: Kengo Kobayashi, Kawasaki; Ryoji Imazeki, Hachioji, both of Japan

[73] Assignee: Fujitsu Fanuc Limited, Hino, Japan

[21] Appl. No.: 808,398

[22] Filed: Jun. 20, 1977

[30] Foreign Application Priority Data

Jun. 28, 1976 [JP] Japan .................... 51-76140
Jun. 28, 1976 [JP] Japan .................... 51-76141

[51] Int. Cl.² ............... G06F 13/00; G05B 19/18
[52] U.S. Cl. ........................ 364/900; 364/474
[58] Field of Search ... 364/900 MS File, 200 MS File, 364/474, 107, 118; 318/568; 365/229

[56] References Cited

U.S. PATENT DOCUMENTS

| | | | |
|---|---|---|---|
| 3,783,251 | 1/1974 | Pavkovich | 364/118 |
| 3,859,638 | 1/1975 | Hume, Jr. | 365/229 |
| 3,924,110 | 12/1975 | Cochran et al. | 364/900 |

*Primary Examiner*—Raulfe B. Zache
*Attorney, Agent, or Firm*—Staas & Halsey

[57] ABSTRACT

A numerical control unit in which command data is inputted from a keyboard and stored in an internal memory and which controls a machine tool based on the stored command data. A cassette type memory is constructed to be detachably mounted on the numerical control unit. When the cassette type memory is mounted on the numerical control unit, the command data can be transmitted between the cassette type memory and the internal memory and stored therein and even when the cassette type memory is removed from the numerical control unit, the stored content can be retained. By repeatedly reading out the command data stored in the cassette type memory, the machine tool can be controlled.

4 Claims, 18 Drawing Figures

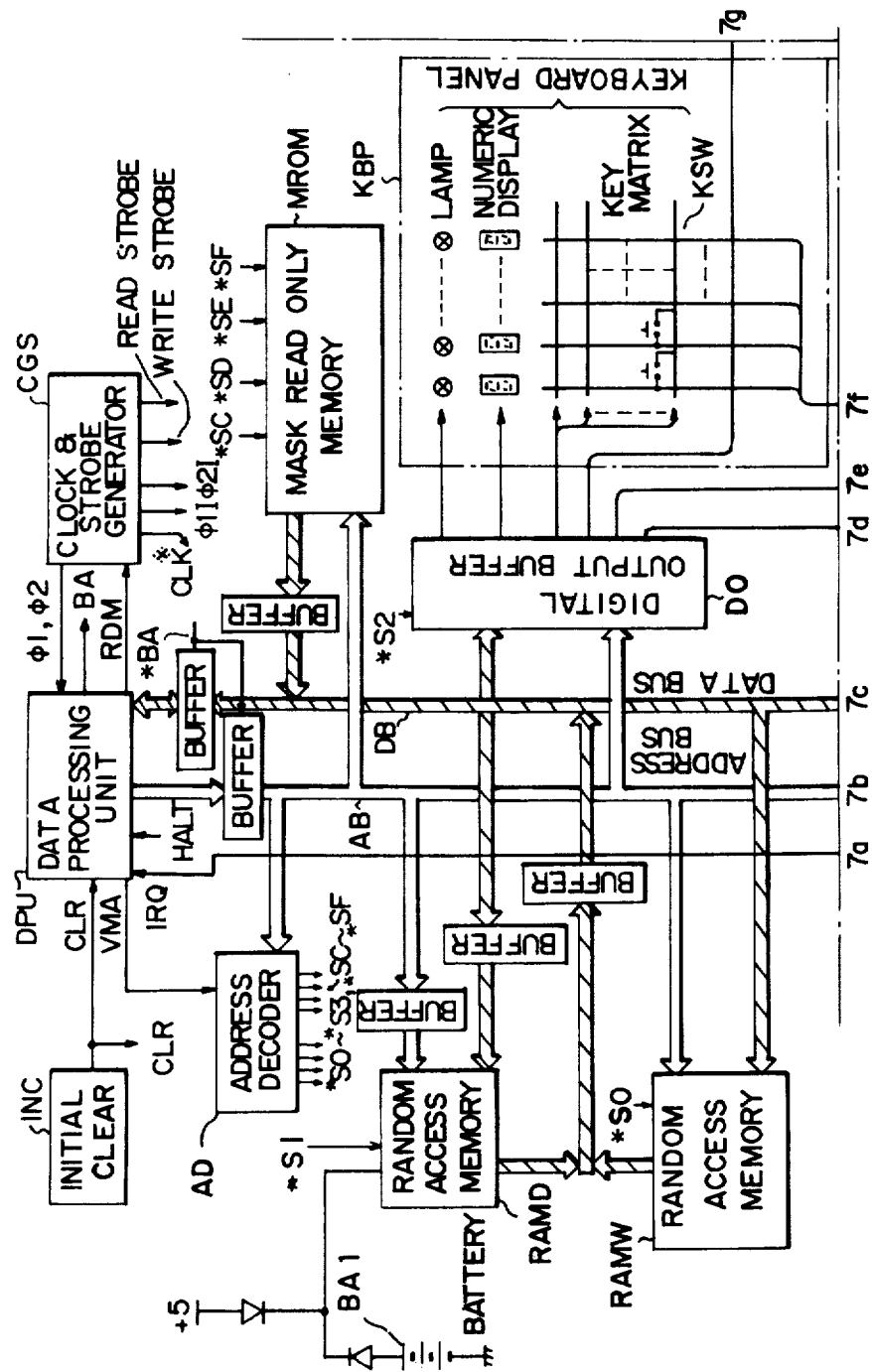

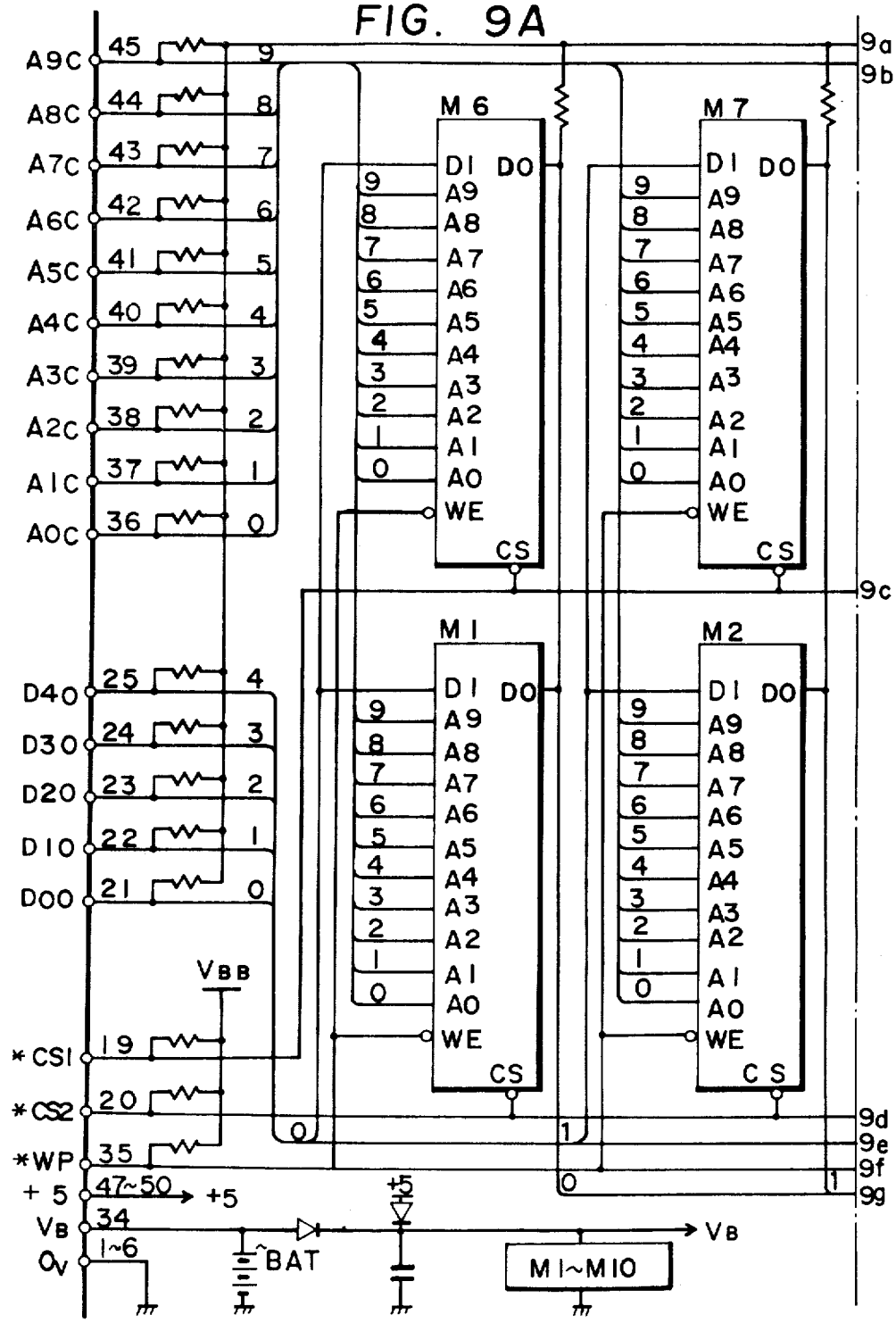

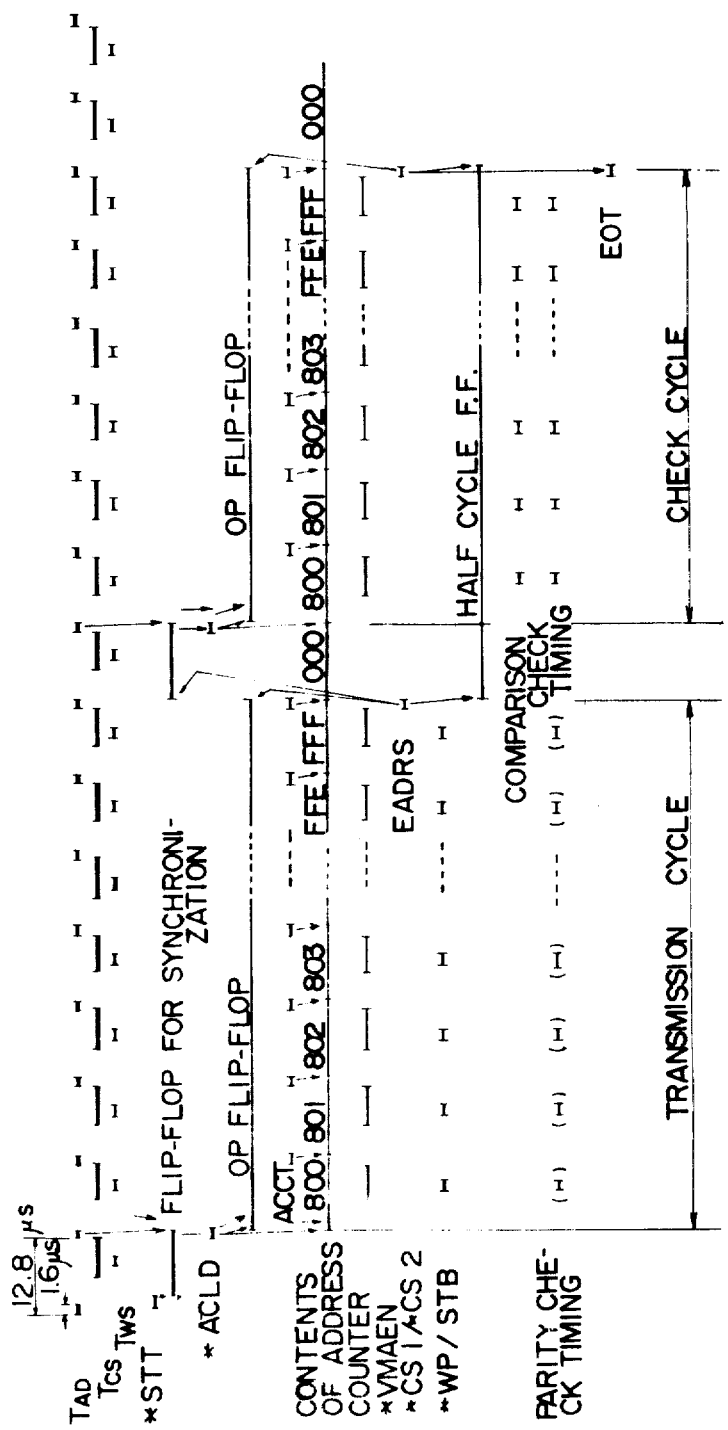

NUMERICAL CONTROL UNIT HAVING A CASSETTE TYPE MEMORY

BACKGROUND OF THE INVENTION

1. Field of the Invention

This invention relates to a numerical control unit having a cassette type memory, and more particularly to a numerical control unit having a cassette type semiconductor memory which is constructed to be detachably mounted on the numerical control unit.

2. Description of the Prior Art

In the prior art, a numerical control unit operates while reading out command data from a paper tape. There have recently been increased apparatus of the type that a memory for storing command data is built into the numerical control unit.

The reasons for this are as follows:

(1) Since no paper tape is used, reliability is high in the case of repeating a machine work.

(2) At the machining site, the operator can directly store command data in the memory to perform machining.

(3) At the machining site, the command data can readily be corrected.

(4) With the progress of semiconductor techniques, it has become possible to use a high-density and inexpensive memory.

By the way, in such a numerical control system, the internal memory for storing the abovesaid command data has recently been demanded to fill the following needs:

(1) The kinds of articles to be worked and the frequency of change and the amount of command data differ with customers and the capacity of the memory required therefor differs with the model. Therefore, it is desired that the capacity of the command data memory of the numerical control unit be easily increased or altered in response to the customer's request.

(2) There are some occasions when one wishes to utilize the command data corrected and stored in the memory of one numerical control unit with other additional numerical control units of the same kind.

If the requirement (1) is satisfied, the cost of the apparatus can be reduced and if the requirement (2) is fulfilled, the working efficiency can be remarkedly enhanced.

However, for satisfying the requirement (1), it is necessary to increase the capacity of the memory in advance, so that when the amount of command data is small, it is uneconomical. Further, for fulfilling the requirement (2), it is necessary to interconnect the numerical control units so that data transmission can be effected, and this is difficult to realize.

SUMMARY OF THE INVENTION

An object of this invention is to provide a numerical control unit adapted so that the capacity of its memory can readily be increased as required.

Another object of this invention is to provide a numerical control unit adapted so that command data stored in its memory can be used for other numerical control units.

Briefly stated, according to this invention, in a numerical control unit having an internal memory for storing command data, the command data stored in the internal memory can be transferred to and stored in a semiconductor memory having a cassette structure detachably mounted on the numerical control unit and the content stored in the semiconductor memory can be conversely transferred to and stored in the internal memory of the numerical control unit.

Other object, features and advantages of this invention will become more apparent from the folling description taken in conjunction with the accompanying drawings.

BRIEF DESCRIPTION OF THE DRAWINGS

FIGS. 7A, 7B and 7C are block diagrams respectively showing in detail the numerical control unit embodying this invention;

FIGS. 9A and 9B are block diagrams respectively showing the memory cassette for use in this invention;

FIG. 11 is a detailed time chart of data transmission.

DESCRIPTION OF THE PREFERRED EMBODIMENTS

Figure 1:
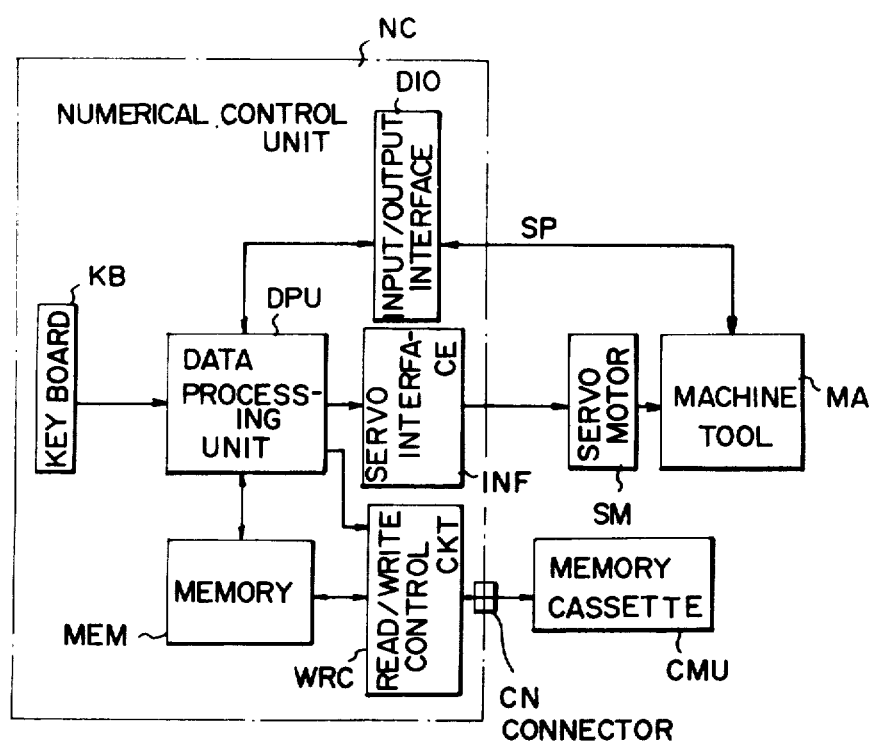
FIG. 1 is a block diagram illustrating an embodiment of this invention.

FIG. 1 illustrates in block diagram an embodiment of this invention. In FIG. 1, reference character NC indicates a numerical control unit; KB designates a command data input keyboard; DPU identifies a data processing unit including a pulse distributing arithmetic circuit, a control circuit, etc.; MEM denotes a command data memory for storing data commanded through the keyboard KB; DIO represents a digital input-output interface for sending to a machine tool MA signals for controlling it, such as a miscellaneous function (M function) command, a spindle speed (S function) command, a tool function (T function) command, etc. from the data processing unit DPU, and for sending a sensor signal, a limit signal, etc. from the machine tool to the data processing unit DPU; INF shows a servo interface supplied with a distribution pulse obtained in the data processing unit DPU to convert the distribution pulse into a signal corresponding to a servo motor SM; CMU refers to a non-volatile cassette type semiconductor memory; and WRC indicates a cassette adapter or read/write control circuit for controlling transfer of the contents of the cassette type memory unit CMU and the command data memory MEM between them under the control of the data processing unit DPU.

In the abovesaid system, when the memory cassette CMU is not used, the command data are inputted through the keyboard KB and subjected to processing such as conversion into a decimal or binary number in the data processing unit DPU, thereafter being stored in the command data memory MEM at predetermined addresses in the order in which they are inputted. Upon storing of full command information necessary for one processing in the command data memory MEM, the data processing unit DPU reads out therefrom the command information block by block based on a start command generated by means not shown, and thereby causes the starting of the data processing. That is, if the command information thus read out is a linear shift command value, known linear pulse distribution operation takes place and the distribution pulse is outputted to the servo motor interface INF. In the case of the M function, the M function information is outputted to the digital input/output interface DIO. Next, assuming that the servo motor SM is, for instance, a pulse motor, the abovesaid distribution pulse sequentially excites predetermined exciting coils in the servo interface, that is, a pulse motor drive circuit to rotate the motor to drive a moving part (a table or tool) of the machine tool MA as commanded, performing predetermined machining. After completion of processing of one block, then the data processing unit DPU reads out the next command block from the memory MEM. Thereafter, the same operation is repeated to achieve processing based on all machining commands, obtaining an article machined as predetermined.

In the case where the abovesaid command information is required to be corrected, the block number of the command data to be corrected and the correcting correction data are entered through the keyboard KB.

Thus, all the command data is entered and stored in the memory MEM through the keyboard without using any command tape. Further, the command data can be easily corrected by an operation of the keyboard and this avoids such a defect as faulty read by a tape, and introduces the advantage that the command data can be changed in accordance with the degree of machining actually observed during machining.

Only with such a method, however, when the configuration of the article being machined has been changed by some cause, it is necessary to re-enter data through the keyboard KB in accordance with the abovesaid configuration and this lowers the working efficiency. Further, if the capacity of the memory MEM is increased so as to prevent a decrease in the working efficiency, the manufacturing cost will rise.

To avoid this, in the present invention, the nonvolatile memory cassette CMU is provided for storing command data and, in the numerical control unit NC, there are provided a connector CN for the connection of the memory cassette and the write/read control circuit WRC which is connected between the connector CN and the command data memory MEM and controlled by the data processing unit DPU.

The memory cassette CMU has previously stored therein a predetermined machining program by separate write means and by the method described later. Further, a plurality of such memory cassettes are prepared in accordance with desired shapes of articles to be machined. The memory cassettes are so constructed as to be detachably mounted on the numerical control unit NC and the memory cassette corresponding to a predetermined shape is selected from them and mounted on the numerical control unit NC.

Thereafter, when a read instruction is inputted to the data processing unit DPU by the operation of the keyboard KB, the content of the memory cassette CMU is stored in the command data memory MEM through the read/write control circuit WRC. Then, a machining start signal is generated from the keyboard KB and a numerical control unit can be achieved in the same manner as described above.

In the case of machining which is not stored in the memory cassette CMU, a numerical control is achieved after machining data are stored in the command data memory MEM from the keyboard KB. If the machining data are desired to be used again in subsequent working or used with other numerical control units, the memory cassette CMU is loaded on the numerical control unit NC and a write instruction is applied to the data processing unit DPU from the keyboard KB by which the machining data stored in the memory MEM are transferred to the memory cassette CMU and stored therein under the control of the write/read control circuit WRC.

With this invention, since memory cassettes are prepared for respective machining data and constructed to be mountable on the numerical control unit NC, a variety of automatically programmed machine works can be achieved only by loading on the numerical control unit NC a selected one of the memory cassettes in accordance with the machine work desired to perform. Further, since the write/read control circuit is provided not in the memory cassette but in the numerical control unit NC, an inexpensive structure can be obtained. Moreover, since no tape is used, there is no possibility of faulty read, which provides for enhanced reliability, and correction of the command data is possible, so that efficient automatically programmed machining can be achieved.

Figure 2:
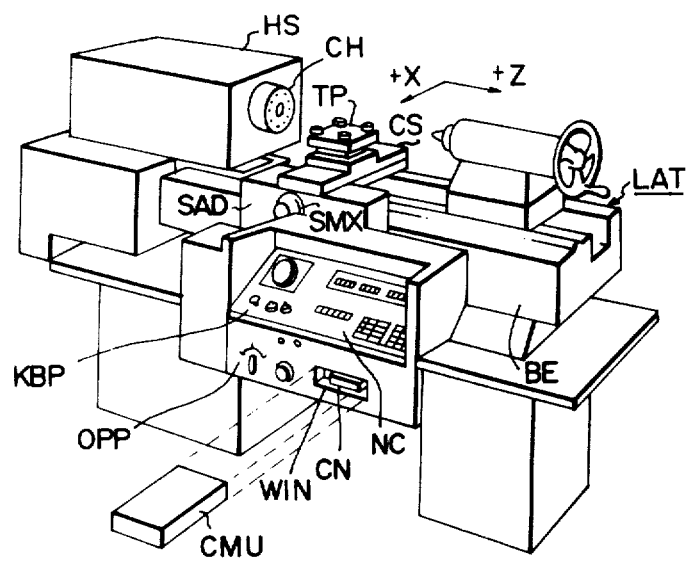
FIG. 2 is a perspective view showing an automatically programmed lathe equipped with a numerical control unit embodying this invention.

FIG. 2 is a perspective view showing a numerical-controlled lathe, which is composed of a lathe LAT, a numerical control unit NC and an operator panel OPP on the side of a machine tool. The lathe LAT is provided with a saddle SAD which is reciprocated by a motor SMZ (not shown) on a bed BE in the Z-direction, a cross-slide CS which is reciprocated by a motor SMX on the saddle SAD in the X-direction, a tool post TP mounted on the cross-slide CS, a head stock HS and a chuck CH affixed to the spindle of the head stock HS.

The numerical control unit NC and the operator panel OPP are mounted on the front of the lathe LAT. The operator panel OPP has a rectangular window WIN and when the memory cassette CMU is inserted in the window WIN, the memory cassette CMU is electrically connected with the numerical control unit NC through the connector CN. The memory cassette CMU can be removed from the operator panel OPP and freely transported. A keyboard panel KBP for the entry of command data, the operator panel OPP and the memory cassette CMU will be described later on.

Figure 3:
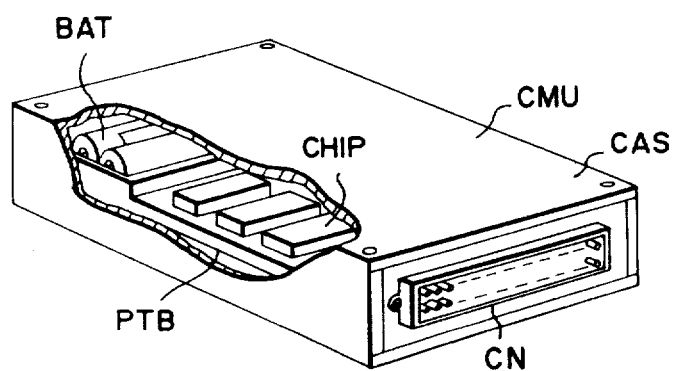
FIG. 3 is a perspective view, partly cut away, of a memory cassette for use in this invention.

FIG. 3 is a perspective view, partly cut away, illustrating the memory cassette CMU. The memory cassette CMU has a configuration of a rectangular parallelepiped and one side of its case CAS made of insulating plates has mounted thereon the connector CN. In the case CAS, there is provided a printed board PTB having mounted thereon a plurality of IC memory element chips CHIP. Further, a battery BAT is provided which supplies power to the IC memory element chips when the memory cassette CMU is removed from the operator panel.

Figure 4:
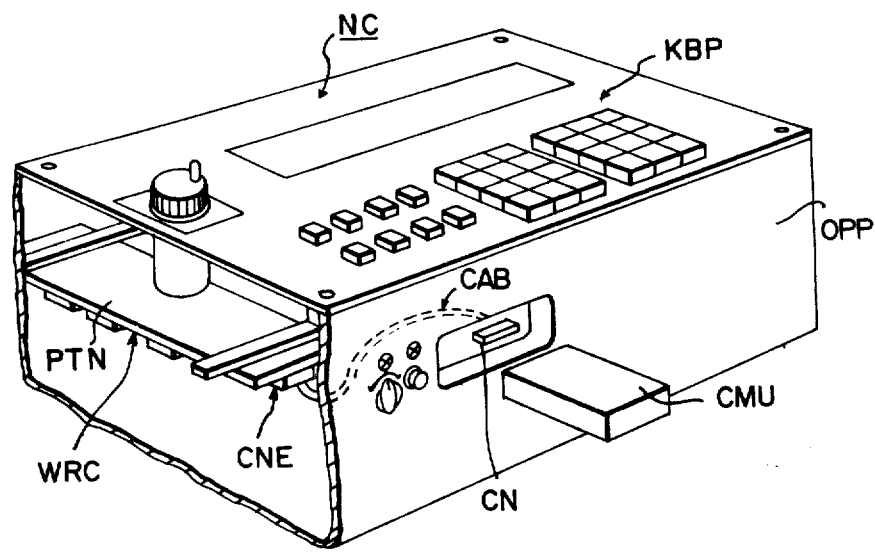
FIG. 4 is a diagram explanatory of the structure for the connection of the memory cassette with a cassette adapter in this invention.

FIG. 4 is explanatory of the connection between the memory cassette CMU and the cassette adapter, i.e. the write/read control circuit WRC. The cassette adapter WRC is mounted on a printed board PTN provided on the side of the numerical control unit NC and the memory cassette CMU is connected to the cassette adapter WRC through a connector CN, a cable CAB and a connector CNE.

Figure 5:
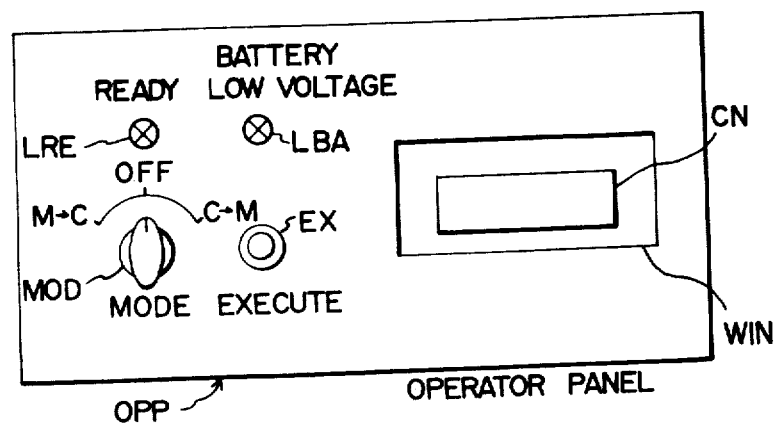
FIG. 5 is an explanatory diagram of an operational panel for use in this invention.

FIG. 5 is explanatory of the operator panel OPP. The operator panel OPP has a mode switch MOD, an execute push button EX, a ready lamp LRE and a battery low voltage lamp LBA in addition to the aforesaid window WIN for the insertion of the memory cassette CMU and connector CN.

The ready lamp LRE is a lamp which indicates the state in which a data transfer, that is, a data transfer from a memory in the numerical control unit to the memory cassette or vice versa is possible. Only while the lamp LRE is in the on state, is the operation of the execute push button EX effective. When the mode switch MOD is in the off state, or when the memory cassette CMU is not inserted, the ready lamp LRE is in the off state.

The battery low voltage lamp LBA is a lamp which indicates whether or not the voltage of the battery in the memory cassette CMU has dropped below an allowable value.

The mode switch MOD is a rotary switch for selecting the data transfer direction, and has three positions of the following meanings:

M→C: The mode of data transfer from the side of the numerical control unit to the memory cassette CMU.

C→M: The mode of data transfer from the memory cassette to the side of the numerical control unit.

OFF: The state in which no data transfer is possible. The execute push button EX is provided for the execution of data transfer.

Figure 6:
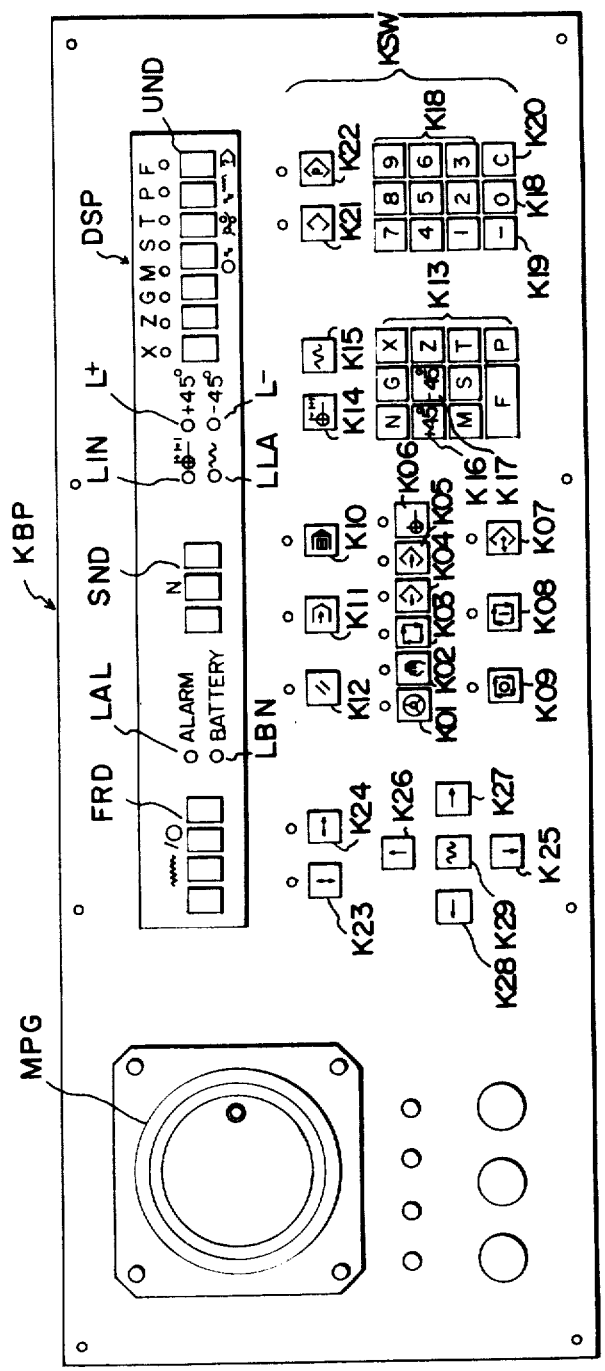
FIG. 6 is an explanatory diagram of a keyboard panel for use in this invention.

FIG. 6 is explanatory of the keyboard panel KBP. The keyboard panel KBP comprises a display part DSP, a key switch KSW and a manual pulse generator MPG. The display part DPS includes a feedrate display FRD, an alarm lamp LAL, a battery lamp LBN, a sequence number display SND, an incremental lamp LIN, a rapid lamp LLA, 45° cutting lamps L+ and L− and a universal display UND. The key switch KSW includes various keys K01 to K29, which have the names, functions and uses shown in Table 1.

TABLE 1

| Key | Name | Function . Use |
|---|---|---|
| K01 | Handle mode | Key switches for selecting the mode of operation. Upon pushing a desired one of them, a lamp above it will light to select the mode corresponding thereto. |
| K02 | Jog mode | |
| K03 | Auto mode | |
| K04 | Display mode | |
| K05 | Store mode | |
| K06 | Preset mode | |
| K07 | Data in/out | A key switch for data input, display, etc. |
| K08 | Cycle start | This key switch starts an automatic operation and a lamp (a start lamp) above the key will light. |
| K09 | Feed hold | When pushing this key, the automatic operation will be stopped and a lamp (a hold lamp) above the key will light. |
| K10 | Single block | When pushing this key switch, a single block mode is selected and a lamp above the key will light. (ALTERNATE) |
| K11 | Test | When pushing this key switch, a test mode is selected and a lamp above the key will light. (ALTERNATE) |
| K12 | Reset | When pushing this key switch, a reset state is obtained. This key switch is used for releasing an alarm state. |
| K13 | Address | This key switch is used mainly for address designation at the time of inputting a program and a system parameter. |
| K14 | Incremental | When inputting a program, in case of an incremental command, this key switch is pushed. (ALTERNATE) |
| K15 | Rapid | When inputting a program, in case of a rapid feed command, this key switch is pushed. (ALTERNATE) |
| K16 | +45° | In case of commanding 45° cutting, these key switches are pushed. (ALTERNATE) |
| K17 | −45° | |
| K18 | Number | This key switch is used when to input a numerical value. |
| K19 | Minus | This key switch is used when to input a minus numerical value. |
| K20 | Cancel | This key switch is used when to cancel inputted data. |
| K21 | Store enable | When pushing this key switch, a program, system parameter, etc. can be inputted. (ALTERNATE) |
| K22 | System parameter | When to input a system parameter, this key switch is pushed. (ALTERNATE) |
| K23 | X-axis select | These key-switches are used for axis selection in case of the handle feed, and axis selection for position indication. A lamp above the selected key switch will light. (ALTERNATE) |
| K24 | Z-axis select | |
| K25 | X-axis jog (+) | These key switches are used in cases of jog feed and step feed. |
| K26 | X-axis jog (−) | |
| K27 | Z-axis jog (+) | |
| K28 | Z-axis jog (−) | |
| K29 | Jog rapid | When this key switch and one of the jog feed key switches are pushed simultaneously, the jog feed rate becomes rapid. |

Note ALTERNATE indicates that when the key switch has once been pushed, the mode becomes effective and when the key switch is pushed once more, the mode becomes ineffective.

Next, the numerical control unit embodying this invention will be briefly described in connection with the input of data and the auto cycle.

Input of data

For the operation of an automatically programmed lathe, it is necessary to input the following two kinds of data.

(1) System parameter

Set data for rapid feed rate, backlash compensation, etc.

(2) Program data

This corresponds to a tape for a numerical control in the prior art.

This data is inputted by the key switches and stored in the memory of the numerical control unit and even if the power source is turned off, the stored content is held.

The procedure for data inputting is as follows:

(1) Push the store enable key K21. (Lamp will light).

(2) To input the system parameter, push key K22. (Lamp will light). To input the program data, the key K22 need not be pushed. (If the lamp is lighting when inputting the program data, the key should be pushed to turn off the lamp.)

(3) Select the store mode. (Push the key K05.)

(4) Set the sequence number. The inputted number will be displayed on the sequence number display. (Push a key N of the address key K13 and push the number key K18 for three digits.)

(5) Push the address keys K13 (X to F). Lamps for the inputted addresses will light.

(6) Input a code (only—is required.) and a numerical value. The inputted code and numerical value will be displayed on the universal display UND.

(7) When inputting the program data, in the case of the rapid feed command, push the key K15. (The corresponding lamp of the universal display UND will light.)

(8) When inputting the program data, in the case of the incremental command, push the key K14. (The corresponding lamp of the universal display UND will be light.)

(9) When inputting the program data, in the case of the 45° cutting command, push the key K16 or K17. (The corresponding lamp of the universal display UND will light.)

(10) When pushing the key K07, the above input data is stored in the memory and the sequence number is automatically made +1. The display of the input data will be extinguished except for the incremental lamp. (Push the incremental key once more.)

(11) When successively inputting data, repeat the steps (5) to (10). After completion of data inputting, push the store enable key K21 to turn off the lamp.

Inputting of System Parameters

The parameters shown in Table 2 are inputted by the above-said operations.

(4) When pushing the data in/out key K07, the data will be displayed. When it is desired to keep the data display, push this key once more and the sequence number will be made +1 and the data of the block will be displayed.

Automatic Running

The operation of automatic running will be described.

(1) Select the auto mode by means of the key K03.

(2) Push the address key to input the sequence number at the head of the program to be executed.

(3) When pushing the cycle start key K08, automatic running will take place in accordance with the program. (The start lamp will light.)

(a) Single block

When pushing the single block key K10, the single block mode will be obtained. (Lamp will light.) Pushing the cycle start key in this state, the program will be executed for only one block (in case of the G function, the program will be executed for required blocks), and after the operation, automatic running will be stopped.

(b) Change of feed rate during automatic running

In the case of changing the cutting feed rate during automatic running, the following operations are achieved.

TABLE 2

| No. | Item | Sequence Number | |
|---|---|---|---|
| 1 | Inch/metric setting | 000 | X X X <u>0 0 0</u> → 100 : Metric system / 254 : Inch system |
| 2 | Backlash compensation of X-axis and Z-axis | 001 | X X <u>0 0</u> <u>0 0</u> (pulse) → Z-axis 00 ~ 99 / → X-axis 00 ~ 99 |
| 33 | Rapid feed rate of X-axis (AUTOMATIC) | 002 | X X <u>0 0 0 0</u> → 3 ~ 5800 mm/min. |
| 44 | Rapid feed rate of Z-axis (AUTOMATIC) | 003 | X X <u>0 0 0 0</u> → 3 ~ 9999 mm/min. |
| 55 | Rapid feed rate of X-axis (MANUAL) | 004 | X X <u>0 0 0 0</u> → 3 ~ 5800 mm/min. |
| 6 | Rapid feed rate of Z-axis (MANUAL) | 005 | X X <u>0 0 0 0</u> → 3 ~ 9999 mm/min. |

(1) When inputting the system parameters, push the system parameter keys. (Lamps will light.)

(2) For all of the address designation, the address key P is used. When the parameters are inputted using other address keys, even if the data in/out key is pushed, it is neglected.

Data Display

The data (system parameters and program data) stored in the memory can be displayed on the universal display UND by the following procedure:

(1) Select the kind of data by means of the parameter key K22.
  Lamp ON: System parameter
  Lamp OFF: Program data (2) Select the display mode by means of the key K04.

(3) Set the sequence number by means of the address key N and the number key.

(1) Push the address key F and the position display will be extinguished and the address lamp will light.

(2) Input data by means of the number key K18 in the F code.

The input data will be displayed.

(3) Push the data in/out key K07 and the cutting feed rate will be changed to the inputted rate.

Figure 7:
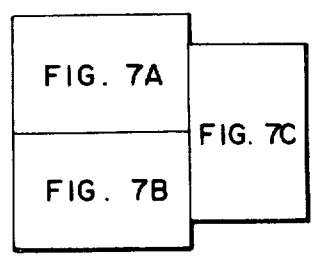
FIG. 7 is explanatory of the arrangement of FIGS. 7A, 7B and 7C.
Figure 7B:
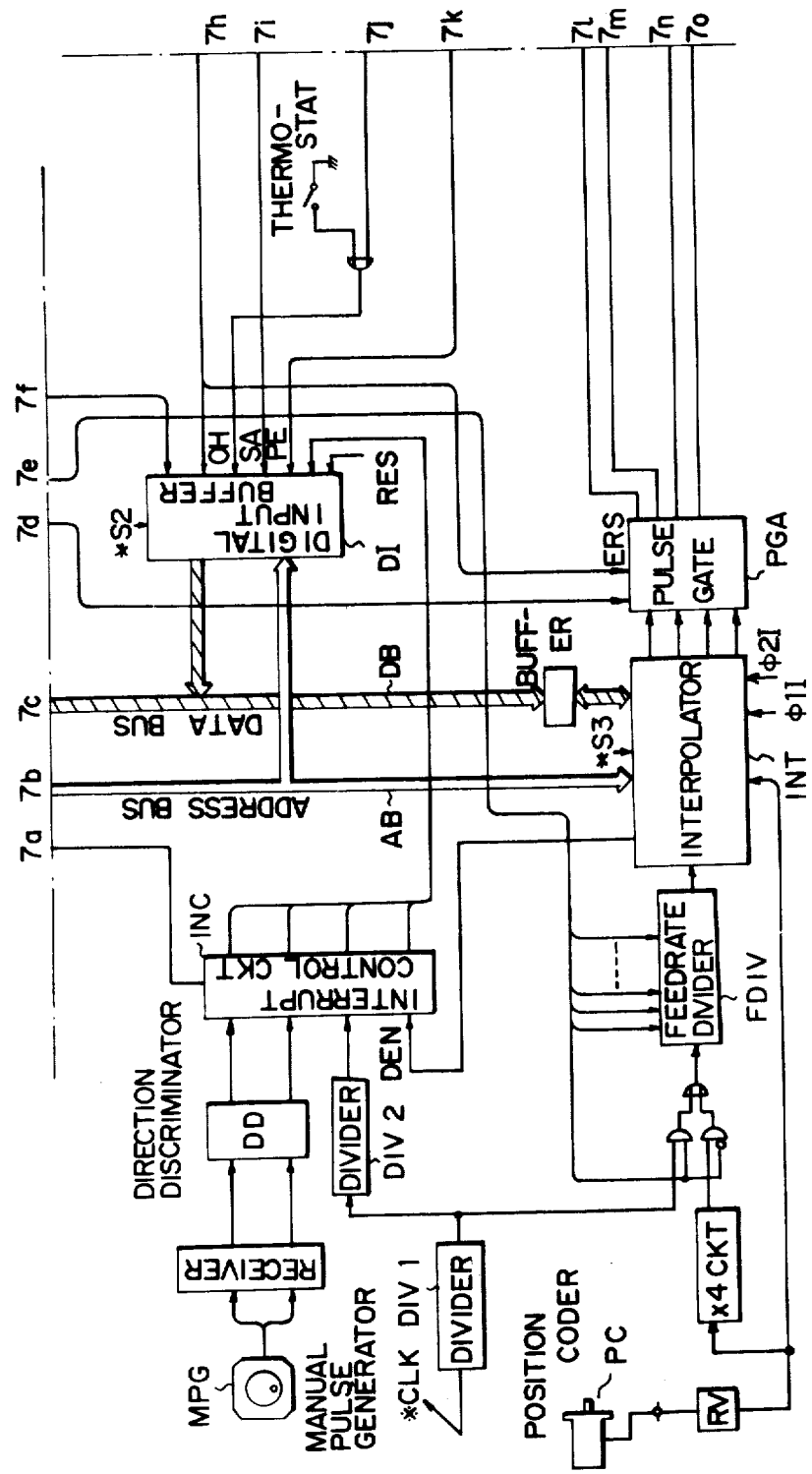
Figure 7C:
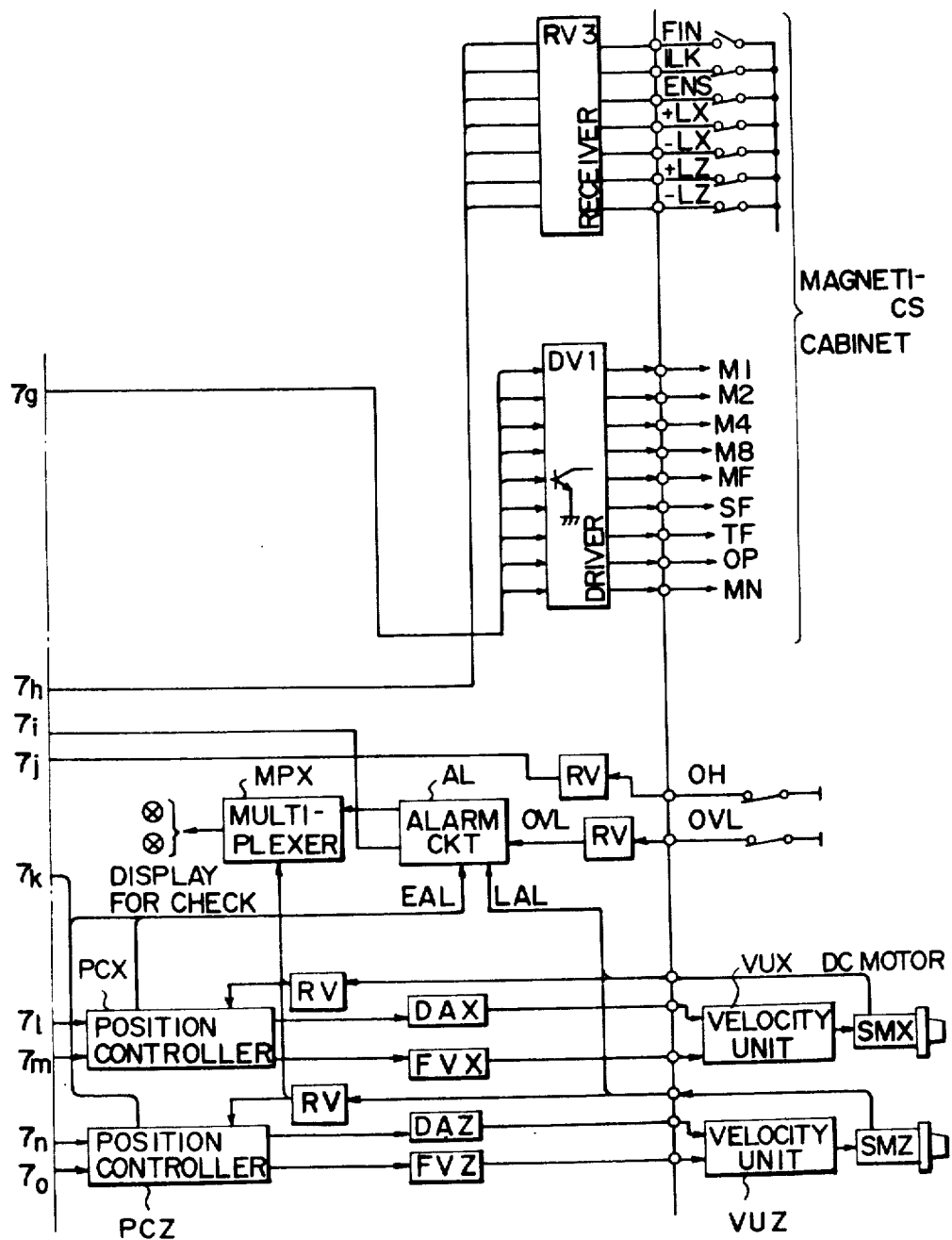

FIGS. 7A, 7B and 7C are block diagrams illustrating the numerical control unit NC embodying this invention, these diagrams being arranged as shown in FIG. 7 and terminals of the corresponding reference numerals 7a to 7o being interconnected. The present embodiment is shown to omit the write/read control circuit WRC, the memory cassette CMU and the machine tool MA depicted in FIG. 1.

The data processing unit DPU has connected thereto a mask read-only memory (mask ROM) MROM, a random access memories RAMW and RAMD, an interpolator INT, a digital input buffer DI and a digital output buffer DO through buffers, an address bus AB and a data bus DB.

The three memories RAMW, RAMD and MROM have memory areas assigned a series of addresses. The memory RAMW is used for an operation in the data processing unit DPU, the memory RAMD comprises an IC memory and is used as a command data storage, and the memory MROM is used as a storage for control programs. The memory RAMD is usually connected to a +5 V power source, and supplied with a necessary voltage from a battery BA1 even if the power source is cut off.

The digital input buffer DI has connected thereto a key matrix KSW of the keyboard panel KBp. The command data inputted from the key matrix KSW can be stored in the memory RAMW or RAMD through the digital input buffer DI.

When the key operation described in connection with the item (3) of the data input is achieved, data such as the sequence number, axis data, the feed rate, etc. is sequentially read out from predetermined addresses in the memory RAMW and temporarily stored and the data, except for the sequence number, is transferred to and stored in one area of the memory RAMD previously assigned for the data of this sequence number. Thereafter, the command data equivalent to an ordinary NC command tape can be similarly stored in the memory RAMD from the keyboard panel KBP.

A numerical control is executed in the following manner: Under the control of the control program stored in the memory MROM, the data processing unit DPU sequentially reads out command data of predetermined sequence numbers in the memory RAMD and displays the sequence numbers and the feed rate on the keyboard panel KBP through the digital output buffer DO. The axis data is inputted in the interpolator INT shown in FIG. 7B and the abovesaid feed rate data is inputted in a feedrate divider FDIV. The interpolator INT achieves a predetermined linear interpolation, and supplies command pulses to an X-axis position controller PCX and a Z-axis position controller PCZ, shown in FIG. 7C, through a pulse gate PGA.

To the position controllers PCX and PCZ are fed back position detecting pulses from motors SMX and SMZ, respectively. D-A converters DAX and DAZ each generate a voltage proportional to a position error and F-V converters FVX and FVZ each generate a voltage proportional to the difference between the commanded velocity and the current one, by which the motors SMX and SMZ are controlled through velocity units VUX and VUZ.

When the M-function, S-function or T-function has been read out from the memory RAMD of FIG. 7A, a signal MF, SF or TF is outputted through the digital output buffer DO and a driver DV1 and, at the same time, a numerical value is outputted in the form of 4-bit data (M1, M2, M4, M8), and applied to a magnetics cabinet. (FIG. 7C)

From the side of the machine tool, a reception finish signal FIN for the M-, S- or T-function, an interlock signal ILK, an emergency stop signal ENS and respective axis stroke end signals +LX, −LX, +LZ and −LZ and applied to the digital input buffer DI through a receiver RV3, and by sensing the state of the digital input buffer DI, the state of the machine tool is detected.

Also, an overheat signal of the motor, an overheat signal OH of the servo interface and an alarm signal SA are applied to the digital input buffer DI. The alarm signal SA is composed of a disconnection detecting signal LAL and an excess error EAL of the position controller PCX which are applied in an alarm circuit AL, and this alarm signal SA can be displayed on the display through a multiplexer MPX.

As illustrated in FIG. 7B, the interpolator INT is supplied with pulses from a position coder PC connected to the spindle for thread cutting, and is capable of interpolation synchronized with the pulses and also interpolation synchronized with the output (a fixed frequency) from the divider DIV1. Upon completion of interpolation based on one data, an end signal DEN is applied to an interrupt control circuit INC to apply an interruption request IRQ to the data processing unit DPU and the data processing unit DPU senses the digital input buffer DI to detect the end of distribution and then applies the next distribution data to the interpolator INT.

Other than the above, the interruption sources for the data processing unit DPU are the output from the divider DIV2 (for sensing the digital input buffer) and a pulse from the manual pulse generator MPG (DD indicating a direction discriminator).

In FIG. 7A, reference character AD designates an address decoder and its outputs *S0 to *S3 indicate selection signals of the memories RAMW and RAMD, the buffer DI/DO and the interpolator INF, respectively, *SC to *SF area selection signals of the mask read-only memory MASK ROM (MROM). Reference character INC identifies an initial clear; CGS denotes a clock and strobe generator; and RV represents a receiver.

A signal HALT applied to the data processing unit DPU is a signal for halting the data processing unit DPU during a data transfer from the memory RAMD to the memory cassette or from the latter to the former. A signal BA derived from the data processing unit DPU is a signal for disconnecting the address bus AB and the data bus DB from the data processing unit DPU during the abovesaid data transfer. A signal RES, which is applied to the digital input buffer DI, is a numerical control unit reset signal.

Figure 8:
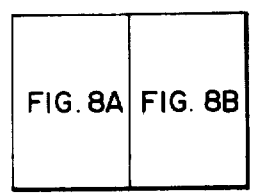
FIG. 8 is explanatory of the arrangement of FIGS. 8A and 8B.
Figure 8A:
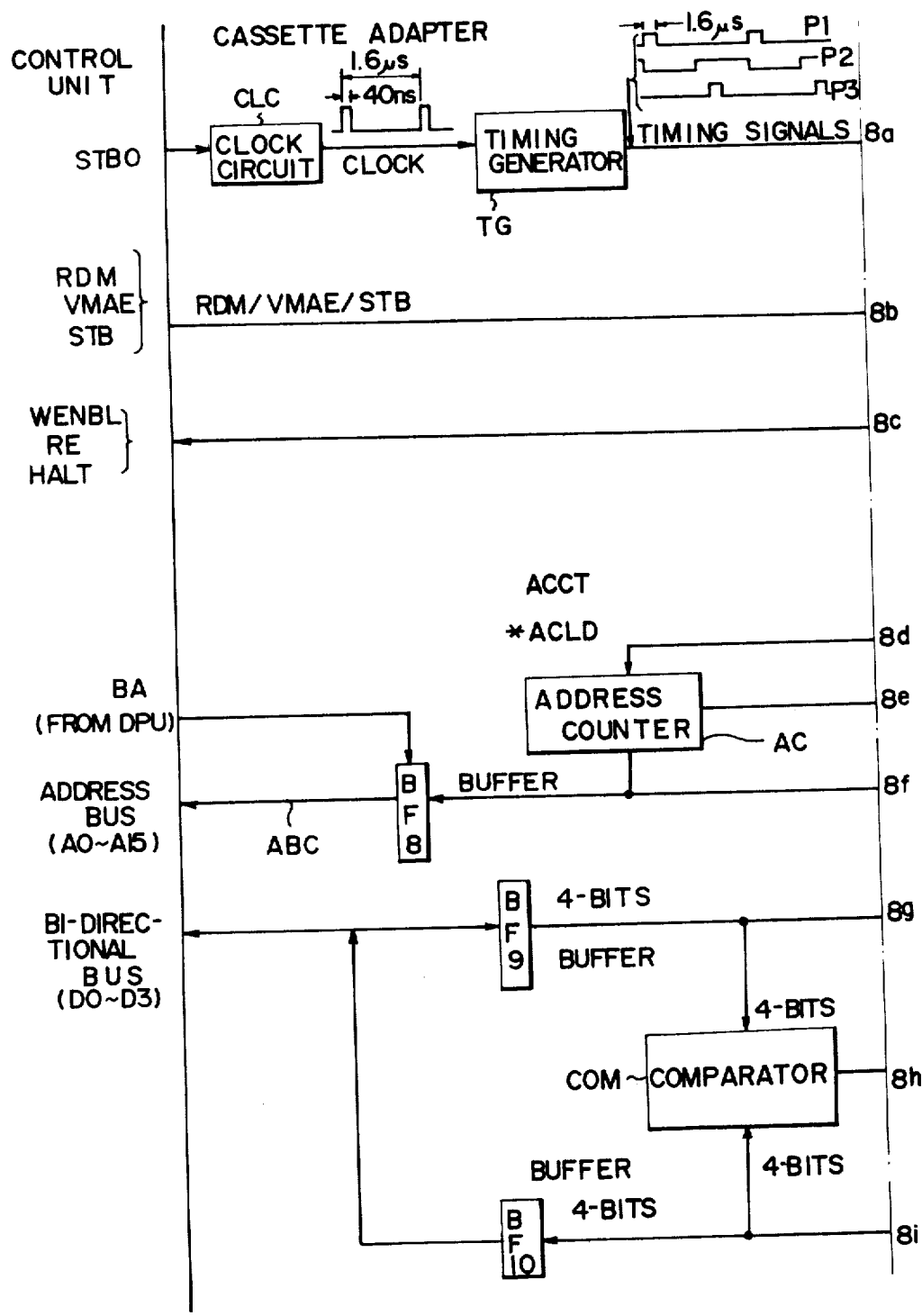
FIGS. 8A and 8B are block diagrams respectively illustrating the cassette adapter for use in this invention.
Figure 8B:
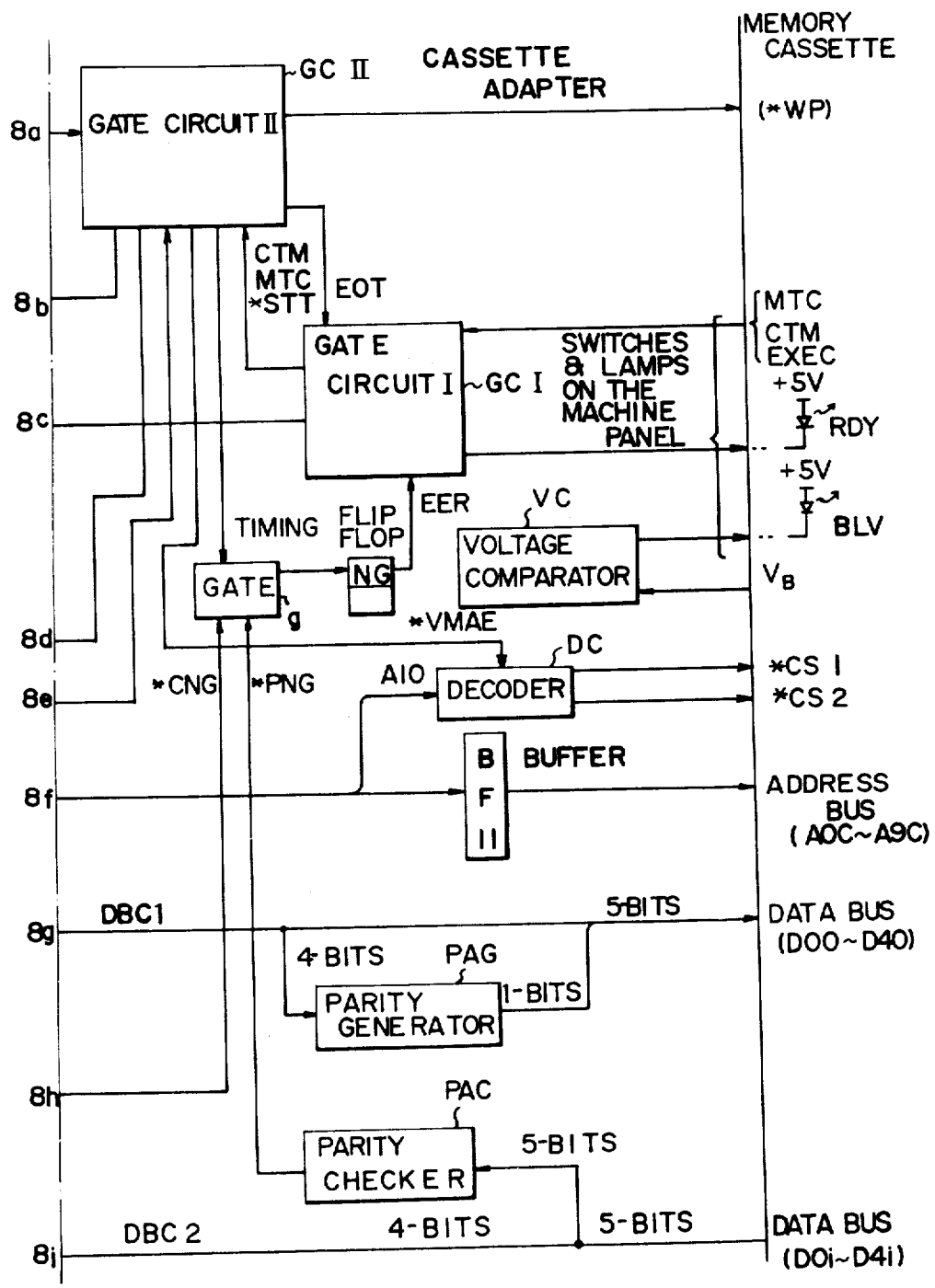

FIG. 8 is explanatory of the arrangement of FIGS. 8A and 8B, which illustrate the read/write control circuit, i.e. the cassette adapter WRC, corresponding terminals marked with the same reference numerals 8a to 8i being interconnected. The cassette adapter WRC includes a clock circuit CLC, a timing generator TG, gate circuits GCI and GCII, an address counter AC, a voltage comparator VC, a decoder DC, a comparator COM, a parity generator PAG, a parity checker PAC, a gate g, buffers BF8 to BF11, an address bus ABC and data buses DBC1 and DBC2.

The clock circuit CLC and the timing generator TG are supplied with a clock pulse STB0 from the clock source to generate various kinds of timing pulses, that is, a signal P1 for counting up the address counter, a signal P2 for the chip selection and a signal P3 for a write pulse, which are applied to the gate circuit GCII.

The gate circuit GCI is supplied with mode signals MTC (a data transfer from the memory in the numerical control unit to the memory cassette) and CTM (a data transfer from the memory cassette to the memory) and the execute signal EXEC from the operator panel, and sends the abovesaid signals MTC and CTM and a transfer start signal *STT to the gate circuit GCII.

Further, the gate circuit GCI applies a write enable signal WENBL, a reset signal RE for the numerical control unit NC and a halt signal HALT for the data processing unit DPU to the control unit.

The gate circuit GCII applies a read mode signal RDM an address validity signal VMAE and a read or write strobe STB to the memory RAMD in response to the signals from the timing generator TG and the gate circuit GCI. Further, the gate circuit GCII applies a write pulse *wp to the memory cassette.

A bus available signal BA derived from the data processing unit DPU connects the address bus AB of the control unit to the address bus ABC of the cassette adapter, and places them under the control of the address counter AC shown in FIG. 8A.

Signals of 10 bits (A0C to A9C) on the address bus ABC become address signals of the memory cassette and a signal A10 of an 11th bit is applied to the decoder DEC together with the signal *VMAE from the gate circuit GCII to generate chip selection signals *CS1 and *CS2 for the memory CMOS RAM.

A data bus DBC1 is a 4-bit data bus connected to the data bus DB of the control unit and data from the control unit are supplied as signals D0O to D4O to the memory cassette through the data bus DBC1. At this time, the parity generator PGA adds a parity bit.

In a data bus DBC2 the outputs D0i to D4i read out from the memory cassette appear, and the data is checked in the parity checker PAC and, at the same time, sent to the control unit through the data bus DB.

The comparator COM operates with a check cycle immediately after the data transmission from the control unit to the memory cassette or vice versa. That is, in the check cycle, the stored data of the memory RAMD of the control unit and the memory cassette are simultaneously read out from the same addresses, and compared with each other in the comparator COM.

Upon detection of a parity check error or data noncoincidence, a signal *PNG or *CNG is produced and an error signal EER is applied to the gate circuit GCI through the gate g and a flip-flop NG. At this time, the gate circuit GCI is put in its alarm state.

The voltage comparator VC supervises the battery voltage $V_B$, and turns on the battery low voltage lamp LBA of the operator panel when the battery voltage has dropped below a certain voltage.

The gate circuit GCII generates a ready state signal RDY and lights the lamp LRE of the operator panel when a data transfer is possible.

Figure 9:
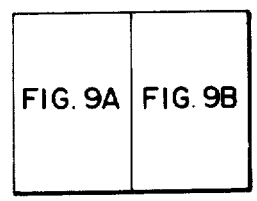
FIG. 9 is explanatory of the arrangement of FIGS. 9A and 9B.
Figure 9B:
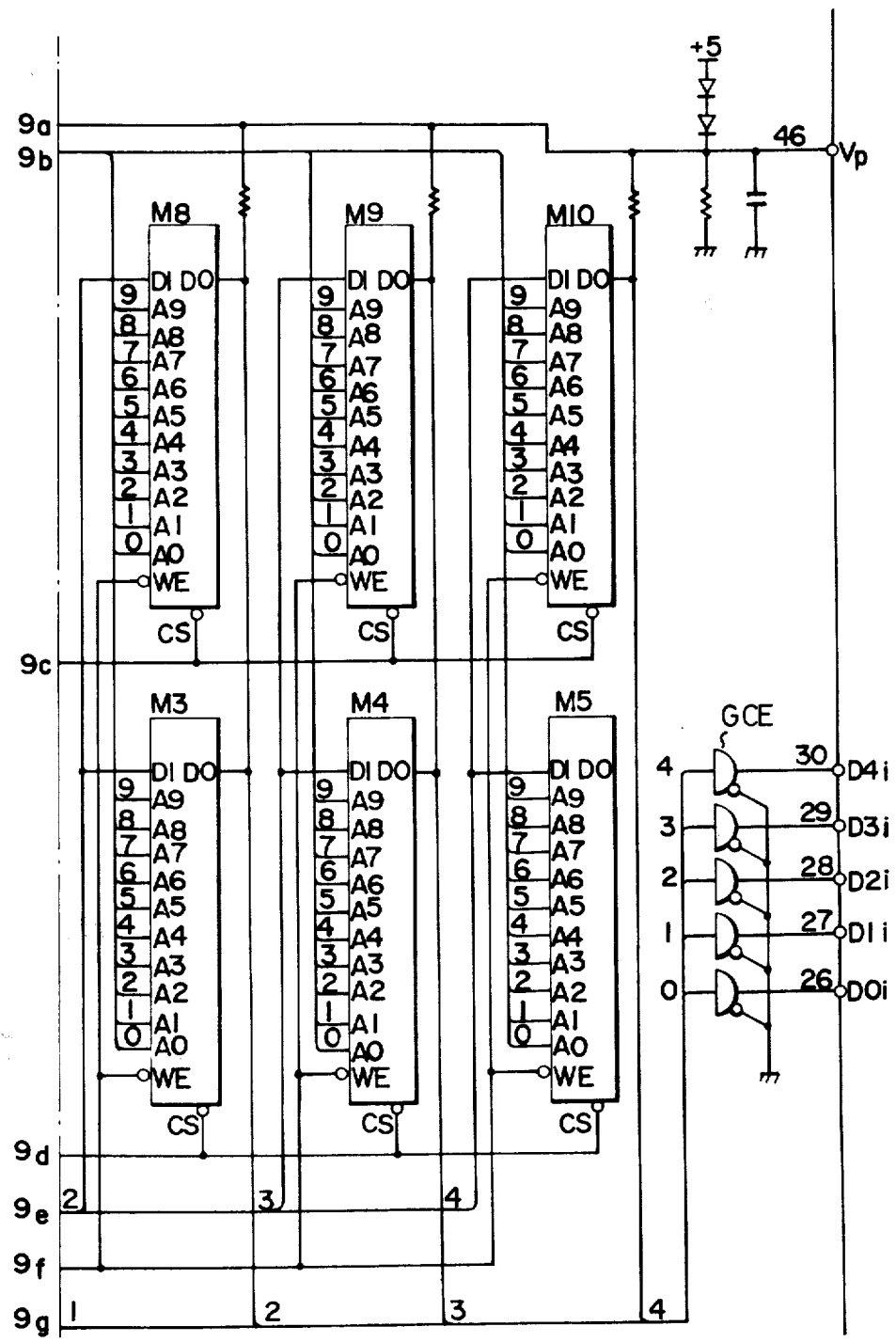

FIGS. 9A and 9B are block diagrams showing the memory cassette. FIG. 9 shows the arrangement of FIGS. 9A and 9B. Terminals marked with the same reference numerals are interconnected respectively. The memory cassette comprises ten CMOS random access memory chips M1 to M10 of the same construction. One of the addresses of the memory cassette is selected by the address signals A0C to A9C of 10 bits and chip selection signals *CS1 and *CS2 of 2 bits.

The input data are D0O to D4O of 5 bits configuration. By making the write pulse *wp low-level, the input data can be written in the address designated by the address signals A0C to A9C and the signals *CS1 and *CS2. Further, when the signal *CS1 or *CS2 is low-level, read/write is possible but when the signal is high-level, the read/write is impossible. Accordingly, by making the chip selection signal *CS1 or *CS2 low-level and the write pulse *wp high-level, the data stored at the designated address is read out as the outputs D0i to D4i through a gate GCE.

The memory chips M1 to M10 are supplied with the power from the +5 V power source when the memory cassette is inserted in the operator panel. When the power source is cut off, the battery BAT supplies the voltage to the memory chips M1 to M10. The voltage $V_B$ can be supervised by the cassette adapter as described above.

Functions of interface signals between the memory cassette and the cassette adapter are shown in Table 3.

In the memory chips M1 to M10, reference character DI indicates a data input terminal; A0 to A9 designate address input terminals; WE identifies a write pulse input terminal; CS denotes a chip selection signal input terminal; and DO represents data output terminals.

TABLE 3

| Item | Name | Direction Adapter | Direction Cassette | Active level | Functions | |
|---|---|---|---|---|---|---|
| 1 | A0C-A9C | → | | High = "1" | Address bus (10-lines) | |
| | | | | Low = "0" | A0C = LSB, A9C = MSB | |
| 2 | D0O-D4O | → | | High = "1" | Data bus from adapter to cassette | Parity check: |
| | | | | Low = "0" | (5-lines) | Odd (1, 3, 5) = NG |
| | | | | | "D4O" is the parity bit. | Even (0, 2, 4) = OK |
| 3 | D0i-D4i | | ← | High = "1" | Data bus from cassette to | Parity check: |
| | | | | Low = "0" | adapter (5-lines) | Odd (1, 3, 5) = NG |
| | | | | | "D4i" is the parity bit. | Even (0, 2, 4) = OK |
| 4 | *CS1/*CS2 | → | | Low | Chip selection for CMOS RAMS | |
| | | | | | The CMOS RAMS latch the address | |
| | | | | | at the falling edge of these | |
| | | | | | signals, so these signals are | |
| | | | | | transmitted after the address | |
| | | | | | becomes valid. | |
| 5 | *wp | → | | Low | Write strobe for CNOS RAMS | |
| | | | | | While this signal is low, the | |
| | | | | | data is written into CMOS RAMS. | |
| 6 | $V_B$ | | ← | Analog voltage | Output voltage of the batteries in the (cassette | |
| 7 | +5 | → | | Power supply | +5V ±5%, 120 mA | |

TABLE 3-continued

| | | Direction | | | |
|---|---|---|---|---|---|
| Item | Name | Adapter | Cassette | Active level | Functions |
| | | | | for cassette | |

Note 1 The voltage applied to A0C-A9C, D00-D40, *CS1, *CS2 and *wp must be lower than $V_{BB}$ + 0.5 including the peak value. $V_{BB}$: Power supply for CMOS RAMS
Note 2 When the power supply for memory cassette (+5V) is OFF, *CS1, *CS2 and *wp must be kept high to avoid the discharge of batteries.
Note 3 The positive narrow pulse (Width is less than 300NS) must not be provided to *CS1 and *CS2 at any condition to protect the data of the memories.

Note (4) The parity check ⎡ODD ..... NG (1, 3, 5)
⎣EVEN .... OK (0, 2, 4)

Figure 10:
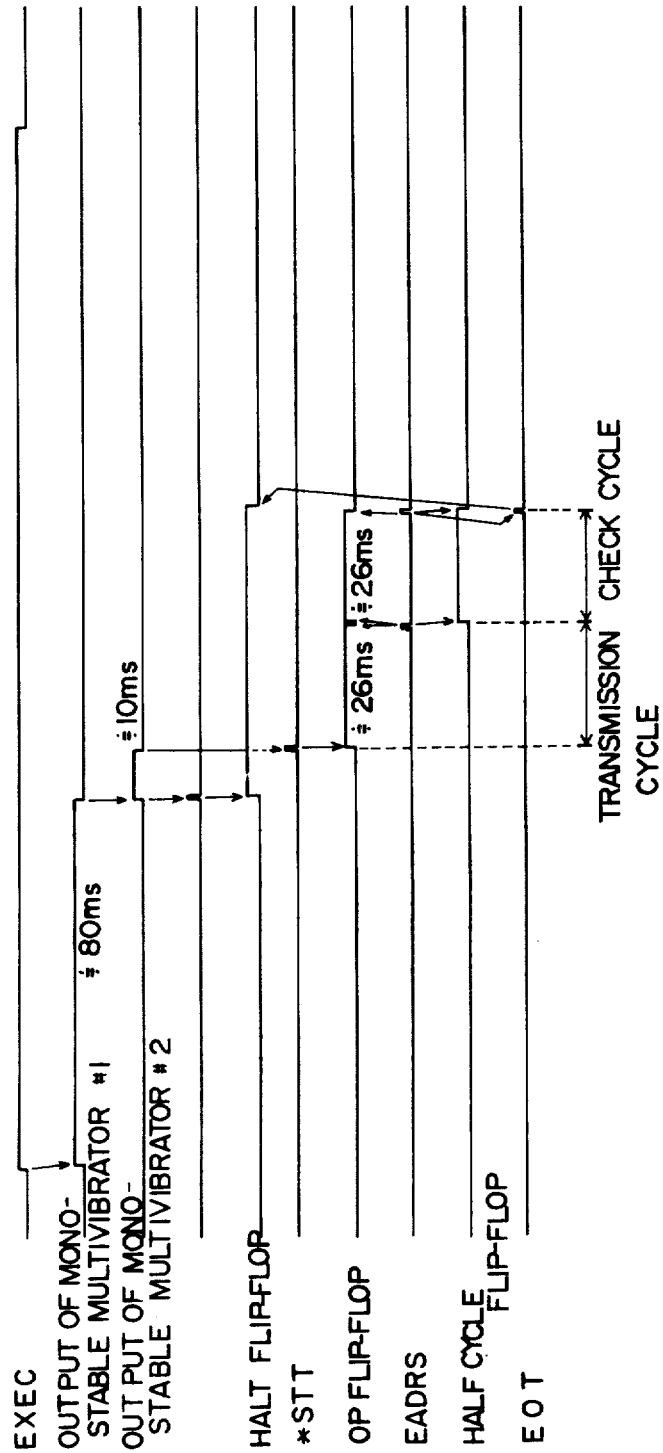
FIG. 10 is a time chart of data transmission in the cassette adapter.

FIG. 10 is a time chart of data transmission in the cassette adapter.

When the mode switch MOD is set and the execute push button EX is pushed on the operator panel, an execution command EXEC is obtained while the push button EX is pushed.

The signal EXEC is applied to the gate circuit GCI shown in FIG. 8 and a time delay of about 80 ms relative to the moment of rise of the signal EXEC is produced in a monostable multivibrator #1. This delay is set to be larger than the time necessary for resetting of the numerical control unit NC. Further, a monostable multivibrator #2 produces a second time delay (about 10 ms) and, at its rise, sets the halt flip-flop to halt the data processing unit DPU of the numerical control unit.

Moreover, the gate circuit GCI produces a start signal *STT at the moment of the fall of the monostable multivibrator #2, and applies the start signal *STT to the gate circuit GCII. The gate circuit GCII sets an OP flip-flop. As a result of this, the data transmission cycle starts. For instance, when the data transfer from the numerical control unit to the memory cassette has been completed, that is, when the content of the address counter AD shown in FIG. 8 has coincided with the end address, a signal EADRS is produced. At its rise, the signal EADRS resets the abovesaid OP flip-flop and, at its fall, sets a half cycle flip-flop and sets again the OP flip-flop.

By setting of the half cycle flip-flop, the data check cycle starts and the memory RAMD of the numerical control unit and the memory CMOS RAM of the memory cassette are simultaneously addressed and the data of the same addresses are read out and compared with each other. This comparison is achieved from the beginning of of the address of the memory cassette to the end address. When the operation has reached the end address, the address counter AD again provides the signal EADRS, which resets the OP flip-flop and the half cycle flip-flop. At this time, the gate circuit GC applies an end-of-transmission signal EOT to the gate circuit GCI, and the gate circuit GCI resets the half cycle flip-flop and the data processing unit DPU is released from its halt state and the transfer operation is completed.

Note (1) While the OP flip-flop is set, the data transmission or check is actually executed.
Note (2) In the case of data transmission from the memory cassette to the numerical control unit NC, the parity check is executed on the data from the memory cassette.
Note (3) There are two checks: a comparison check and a parity check. The parity check is executed on the data from the memory cassette only.

FIG. 11 is a detailed time chart of the data transmission.

One cycle of the data transmission is 12.8 μs and basic timing signals TAD, TCS and TWS are derived from the timing generator TG.

Upon generation of the transfer start signal *STT, a flip-flop for synchronization is set to obtain an address counter load signal *ACLD with a first timing signal TAD and the OP flip-flop is also set.

In the address counter AD first addresses of the memory RAMD and the memory cassette, for example, 800, are set by the address counter load signal *ADLD.

Next, in synchronization with the timing signal TCS, an address validdity signal *VMAE# is applied to the memory RAMD on the side of the numerical control unit NC, and the chip selection signals *CS1 and *CS2 are applied to the memory cassette.

Then, if the write strobe signal STB of the memory RAMD is made low-level in synchronization with the timing signal TWS, data read out from the address 800 of the memory cassette is written in the address 800 of the memory RAMD. In the write strobe signal STB is made high-level and if the write pulse *wp on the side of the memory cassette is made low-level, the data at the address 800 of the memory RAMD is written in the address 800 of the memory cassette. Which of the signals is made high- or low-level is dependent upon whether the mode switch MOD of the operator panel is set at C→M (CTM) or M→C (MTC). In the case of the data transmission from the memory cassette to the side of the numerical control unit, the parity check takes place at the timing of the timing signal TWS in the transmission cycle.

Next, at the timing of the timing signal TAD, a count-up signal ACCT of the address counter AD is generated to add 1 to the address to make it 801 and, thereafter, the same cycle is repeated. When the end address is reached to produce the signal EADRS, the half cycle flip-flop is actuated and the flip-flop for synchronization is actuated again, by which the address counter load signal *ACLD is produced at the timing of the first timing signal TAD. As a result of this, 800 is set again in the address counter AD and, at the timing of the timing signal TCS, the chip selection signals *VMAE#, *CS1 and *CS2 are produced and, at the timing of the timing signal TWS, the comparison check and the parity check are carried out. Further, at the timing of the next timing signal TAD, the address counter is counted up by the address counter load signal and similar operations are repeated. When the control has reached the end address, the half cycle flip-flop and the OP flip-flop are reset by the address EADRS to produce the end-oftransmission signal EOT, thus completing the transmission.

It will be apparent that many modifications and variations may be effected without departing from the scope of novel concepts of this invention.

What is claimed is:

1. In a numerical control unit for controlling a machine tool, said numerical control unit comprising an internal memory means for storing program data for controlling said machine tool, a data processing means operatively connected to the said memory means for processing the data stored in said internal memory means, input and output means operatively connected to said data processing means for interfacing with said machine tool, and a manual data input means operatively connected to said data processing means for manually entering program data for controlling said machine tool into said numerical control unit, the improvement comprising a removable external semiconductor memory cassette means operatively connected to said data processing means and said internal memory means through a read/write control means, said read/write control means interfacing said external semiconductor memory cassette means with said internal memory means and said data processing means, said data processing means controlling said numerical control unit to transfer stored data from said external semiconductor memory cassette means to said internal memory means and from said manual data input means and said internal memory means to said external semiconductor memory cassette means, wherein said read/write control means comprises:
- a clock circuit/timing generator means for providing timing signals for controlling said read/write control means in response to a strobe signal from said data processing means;
- first and second gate circuit means operatively connected to each other and to said clock circuit/timing generator means for transferring a plurality of control signals between said data processing means and said semiconductor memory cassette means;
- an address counter, decoder, and a pair of buffer means operatively connected to said second gate circuit means for controlling the addresses of the data stored in said internal memory means and said semiconductor memory cassette means;
- a pair of data buffer means operatively connected between a data bus from said data processing means and a pair of data busses from said semiconductor memory cassette means for buffering said data transferred between said data processing means and said semiconductor memory cassette means;
- a comparator means, parity generator means, parity checker means, and gating means operatively connected to said semiconductor memory cassette means data busses and said second gate circuit means for insuring the errorless transfer of data between said data processing means and said semiconductor memory cassette means.

2. A numerical control unit as in claim 1, wherein said external semiconductor memory cassette means is operatively connected to said read/write control means through an electrical connector and said external semiconductor memory cassette means retains the data stored therein when disconnected from said numerical control unit.

3. A numerical control unit as in claim 2, wherein said external semiconductor memory cassette means further comprises an internal power source means for supplying electrical power to said semiconductor memory cassette means when said semiconductor memory cassette is disconnected from said numerical control unit.

4. A numerical control system for controlling a machine tool, said system including a numerical control unit comprising a keyboard for manually entering program data for controlling said machine tool into said numerical control unit, a data processing unit operatively connected to the keyboard for processing the data entered into the numerical control system, an internal memory operatively connected to the data processing unit for storing said data, a servo interface operatively connected to the data processing unit, an electrical connector means for connecting a detachable semiconductor memory cassette means to the numerical control unit, said semiconductor memory cassette means operatively connected to said internal memory and said data processing unit to provide data to said data processing unit and said internal memory means, said servo interface providing signals to control said machine tool, said data processing unit arranged to process said data from said keyboard and said data stored in the internal memory and said semiconductor memory cassette means so as to control said machine tool through said servo interface, said numerical control unit further comprising a read/write control circuit means connected between said semiconductor memory cassette means and said data processing unit and said internal memory means and arranged such that the data stored in the semiconductor memory cassette means can be transferred to and stored in the internal memory means and the data stored in the internal memory means can be transferred to and stored in the external semiconductor cassette means, wherein said read/write control means comprises:
- a clock circuit/timing generator means for providing timing signals for controlling said read/write control means in response to a strobe signal from said data processing means;
- first and second gate circuit means operatively connected to each other and to said clock circuit/timing generator means for transferring a plurality of control signals between said data processing means and said semiconductor memory cassette means;
- an address counter, decoder, and a pair of buffer means operatively connected to said second gate circuit means for controlling the addresses of the data stored in said internal memory means and said semiconductor memory cassette means;
- a pair of data buffer means operatively connected between a data bus from said data processing means and a pair of data busses from said semiconductor memory cassette means for buffering said data transferred between said data processing means and said semiconductor memory cassette means;
- a comparator means, parity generator means, parity checker means, and gating means operatively connected to said semiconductor memory cassette means data busses and said second gate circuit means for insuring the errorless transfer of data between said data processing means and said semiconductor memory cassette means.

* * * * *